United States Patent [19]

Brueggemann

[11] Patent Number: 5,196,957
[45] Date of Patent: Mar. 23, 1993

[54] LASER SCANNER WITH POST-FACET LENS SYSTEM

[75] Inventor: Harry P. Brueggemann, San Marino, Calif.

[73] Assignee: Olive Tree Technology, Inc., San Marino, Calif.

[21] Appl. No.: 503,734

[22] Filed: Apr. 3, 1990

Related U.S. Application Data

[63] Continuation-in-part of Ser. No. 496,459, Mar. 20, 1990, abandoned.

[51] Int. Cl.$^5$ .................. G02B 26/08; G02B 7/02
[52] U.S. Cl. .................. 359/206; 359/662; 359/820
[58] Field of Search .................. 350/6.1–6.91, 350/413–422, 430, 412, 573, 254; 359/196–226, 819–820, 662–664

[56] References Cited

U.S. PATENT DOCUMENTS

| | | | |
|---|---|---|---|
| 2,966,823 | 1/1961 | Trimble | 350/434 |
| 3,675,016 | 7/1972 | Blaisdell et al. | 350/6.7 |
| 3,750,189 | 7/1973 | Fleisher | 350/433 |
| 3,751,587 | 8/1973 | Insler et al. | 358/481 |
| 3,865,465 | 2/1975 | Tatuoka et al. | 350/6.8 |
| 3,867,571 | 2/1975 | Starkweather et al. | 350/486 |
| 3,870,394 | 3/1975 | Ploeckl | 350/6.8 |
| 3,890,034 | 6/1975 | Ploeckl | 350/6.8 |
| 3,922,485 | 11/1975 | Starkweather et al. | 350/6.8 |
| 3,938,881 | 2/1976 | Biegelsen et al. | 350/358 |
| 3,944,323 | 3/1976 | Starkweather | 350/6.6 |
| 3,970,359 | 7/1976 | Starkweather | 350/6.8 |
| 3,973,825 | 8/1976 | Starkweather | 350/6.8 |
| 3,974,506 | 8/1976 | Starkweather | 358/300 |
| 3,995,110 | 11/1976 | Starkweather | 358/481 |
| 4,002,830 | 1/1977 | Brown et al. | 358/481 |
| 4,015,081 | 3/1977 | Starkweather | 358/206 |
| 4,027,961 | 6/1977 | Starkweather | 355/202 |
| 4,034,408 | 7/1977 | Starkweather | 358/481 |
| 4,040,096 | 8/1977 | Starkweather | 358/302 |
| 4,080,633 | 3/1978 | Starkweather | 358/481 |
| 4,084,197 | 4/1978 | Starkweather | 358/300 |
| 4,108,532 | 8/1978 | Minoura | 350/6.6 |
| 4,116,537 | 9/1978 | Dilworth | 359/820 |
| 4,121,883 | 10/1978 | Goshima et al. | 350/6.8 |
| 4,179,183 | 12/1979 | Takeoka et al. | 350/6.1 |
| 4,213,157 | 7/1980 | DeBenedictis et al. | 358/293 |
| 4,230,394 | 10/1980 | Brueggemann et al. | 350/6.8 |
| 4,247,160 | 1/1981 | Brueggemann | 350/6.8 |
| 4,274,703 | 6/1981 | Fisli | 350/6.8 |
| 4,277,128 | 7/1981 | Kawamura | 350/6.8 |
| 4,284,994 | 8/1981 | Radi | 350/6.8 |
| 4,304,459 | 12/1981 | Kramer | 350/3.71 |
| 4,319,807 | 3/1982 | Horton | 350/6.4 |
| 4,379,612 | 4/1983 | Matsuoka et al. | 350/6.8 |
| 4,397,521 | 8/1983 | Antos et al. | 350/6.8 |
| 4,443,055 | 4/1984 | Matsuoka et al. | 350/6.5 |
| 4,447,112 | 5/1984 | Matsuoka et al. | 350/6.5 |
| 4,448,499 | 5/1984 | Tokumaru | 350/573 |

(List continued on next page.)

FOREIGN PATENT DOCUMENTS

| | | | |
|---|---|---|---|
| 19757 | 2/1979 | Japan | 359/820 |
| 9109 | 1/1983 | Japan | 359/820 |
| 88509 | 4/1989 | Japan | 359/205 |
| 1092714 | 4/1989 | Japan | 359/205 |
| 221910 | 9/1990 | Japan | 359/206 |

*Primary Examiner*—Bruce Y. Arnold
*Assistant Examiner*—Thong Nguyen
*Attorney, Agent, or Firm*—Matthew F. Jodziewicz

[57] ABSTRACT

A scanner includes a light source for producing a light beam and a multifaceted polygon for directing the light beam to a spot on a surface to be scanned, such as at the surface of a photoreceptor or a document to be read, that is located at a predetermined location relative to the polygon and for moving the spot across the surface along a scan line or predetermined length. The scanner also includes a post-facet lens system with first and second elements configured to compensate for field curvature and wobble without compensating for scanner non-linearity. They are composed of plastic, the surfaces of the elements having curvature in both the scan plane and the cross-scan plane as well as less magnification than existing post-facet lens systems.

11 Claims, 2 Drawing Sheets

U.S. PATENT DOCUMENTS

| | | | |
|---|---|---|---|
| 4,475,787 | 10/1984 | Starkweather | 350/6.4 |
| 4,496,209 | 1/1985 | Itoh et al. | 350/6.8 |
| 4,512,625 | 4/1985 | Brueggemann | 350/6.8 |
| 4,523,801 | 6/1985 | Baba et al. | 355/3 R |
| 4,538,895 | 9/1985 | Higgins et al. | 350/6.8 |
| 4,565,421 | 1/1986 | Minoura | 350/6.8 |
| 4,571,021 | 2/1986 | Minoura et al. | 350/6.8 |
| 4,585,296 | 4/1986 | Minoura et al. | 350/6.5 |
| 4,595,947 | 6/1986 | Breuggemann | 358/75 |
| 4,606,601 | 8/1986 | Starkweather | 350/6.4 |
| 4,609,945 | 9/1986 | Oguino | 359/820 |
| 4,624,528 | 11/1986 | Brueggemann | 350/6.7 |
| 4,639,072 | 1/1987 | Itoh et al. | 350/6.8 |
| 4,640,573 | 2/1987 | Kataoka et al. | 350/254 |
| 4,662,709 | 5/1987 | Brueggemann | 350/6.7 |
| 4,674,825 | 6/1987 | Tateoka et al. | 350/6.8 |
| 4,682,842 | 7/1987 | Brueggemann | 350/6.7 |
| 4,712,884 | 12/1987 | Sakuma et al. | 350/434 |
| 4,715,699 | 12/1987 | Morimoto | 350/6.8 |
| 4,719,515 | 1/1988 | Miyagawa et al. | 358/268 |
| 4,720,168 | 1/1988 | Kaneko | 359/820 |
| 4,720,632 | 1/1988 | Kaneko | 250/235 |
| 4,729,617 | 3/1988 | Shimada et al. | 359/205 |
| 4,756,583 | 7/1988 | Morimoto | 350/6.5 |
| 4,756,584 | 7/1988 | Takanashi | 350/6.8 |
| 4,756,585 | 7/1988 | Kaneko et al. | 350/6.8 |
| 4,786,151 | 11/1988 | Hamada | 350/434 |
| 4,789,230 | 12/1988 | Ohta | 350/6.8 |
| 4,792,218 | 12/1988 | Nakajima et al. | 350/412 |
| 4,799,747 | 1/1989 | Yamakawa | 350/6.8 |
| 4,802,721 | 2/1989 | Fujita | 350/6.8 |
| 4,805,974 | 2/1989 | Brueggemann et al. | 350/6.7 |
| 4,818,046 | 4/1989 | Kondo | 350/6.8 |
| 4,850,663 | 7/1989 | Yamamoto et al. | 350/6.8 |
| 4,882,490 | 11/1989 | Takasaki et al. | 250/236 |
| 4,898,437 | 2/1990 | Brueggmann | 350/6.7 |
| 4,900,138 | 2/1990 | Atkinson, III et al. | 350/413 |
| 4,940,310 | 7/1990 | Hamada | 250/236 |
| 4,941,719 | 7/1990 | Hisada et al. | 350/6.5 |
| 4,950,889 | 8/1990 | Budd et al. | 250/236 |
| 5,015,050 | 5/1991 | Itabashi | 359/206 |

LASER SCANNER WITH POST-FACET LENS SYSTEM

CROSS REFERENCE TO RELATED APPLICATION

This application is a continuation-in-part of copending U.S. patent application Ser. No. 496,459 filed Mar. 20, 1990, now abandoned.

BACKGROUND OF THE INVENTION

1. Technical Field

This invention relates generally to input and output scanners, and more particularly to a scanner having a multifaceted rotating polygon that directs a beam of light through a post-facet lens system toward a surface to be scanned.

2. Background Information

Parent application Ser. No. 496,459 filed Mar. 20, 1990, of which this application is a continuation-in-part, is incorporated by reference for the scanner background information and details of scanner construction provided. It describes a scanner with a post-facet lens system that compensates for field curvature and wobble without compensating for scanner non-linearity. That results in the post-facet lens system being less complicated. It is less costly. It avoids the introduction of unwanted aberrations. It can be configured with just two elements, and it still allows non-optical compensation for scanner non-linearity if desired.

Despite those advantages, manufacturers seek additional cost reductions. For that purpose, plastic elements might seem a likely choice because plastic elements can cost far less than glass elements. But using plastic involves problems such as the indeterminate surface tension of hot plastic. It can cause flat surfaces to deform during cooling and thereby complicate the manufacturing process.

In addition, plastic exhibits greater changes in refractive index with temperature than does glass and that can change the location of the focus beyond acceptable limits. In that regard, the toroidal wobble-compensating element in many existing scanner designs causes the cross-scan plane to be several times more sensitive to temperature defocusing than the scan plane. That is because the toroidal shape magnifies the image of the facet at the photoreceptor.

So, existing post-facet lens systems do not use plastic elements despite a potential for significant cost reduction. Therefore, it is desirable to have some way to overcome the problems described.

SUMMARY OF THE INVENTION

This invention solves the problems outlined above by providing a scanner with a post-facet lens system having plastic elements that are configured with curved surfaces and less magnification. Curving the surfaces overcomes the indeterminate surface tension problem while less magnification reduces the change of focus occurring with changes in temperature. Thus, the scanner enjoys the benefit of using less costly plastic lens elements without being unacceptably temperature sensitive.

To better visualize the way the scanner differs from existing scanners, recall that the parent application describes a scanner having a post-facet lens system with first and second lens elements configured to compensate for field curvature and wobble without compensating for scanner non-linearity. Among other things, that removes a severe restraint and permits much better performance of the optical design compared to existing post-facet lens systems configured to compensate for scanner non-linearity as well. As a result, the elements can be configured to have less magnification than elements of existing post-facet lens systems. That is important because less magnification means less change of focus with changes in temperature. In addition, more of the depth-of-focus budget can be allocated to temperature changes in focus because none is required for field curvature. In other words, the depth-of-focus for any particular design is often allocated to manufacturing tolerances, field curvature, and changes in focus. But with a flat field, none is required for field curvature so that more is available for changes in focus and, therefore, the design can tolerate greater changes in focus.

Generally, a scanner system constructed according to the invention includes a light source for producing a light beam. It also includes scanning means for directing the light beam to a spot on a surface to be scanned that is located at a predetermined location relative to the scanning means and for moving the spot across the surface along a scan line of predetermined length. In addition, it includes a post-facet lens system interposed between the scanning means and the scan line for compensating for field curvature and wobble. Those elements may be similar in many respects to the scanner system described in the parent application. According to a major aspect of the invention, however, the post-facet lens system includes first and second elements composed of plastic material.

Preferably, the surfaces of the first and second elements are curved in both the scan plane and the cross-scan plane, one embodiment having a spherical first surface of the first element and toroidal surfaces thereafter. Preferably, the post-facet lens system is configured to have less magnification (e.g., less than four) than existing post-facet lens systems (e.g., a system using an f-theta lens). In addition, the first and second elements of the post-facet lens system are configured to compensate for field curvature and wobble without compensating for scanner non-linearity, and they are diffraction limited at one of 300, 400, 500, and 600 dots-per-inch (dpi).

According to another aspect of the invention, the post-facet lens system may include a base that serves to link the first and second elements to the predetermined location at which the surface to be scanned is located. The base serves as means for mechanically linking the first and second elements to the predetermined location at which the surface is located, and it is at least partially composed of a material that exhibits a thermal coefficient of expansion such that dimensional changes in the structure occurring with changes in temperature at least partially compensates for changes in focus occurring with changes in temperature.

DESCRIPTION OF THE PREFERRED EMBODIMENT

Figure 1:
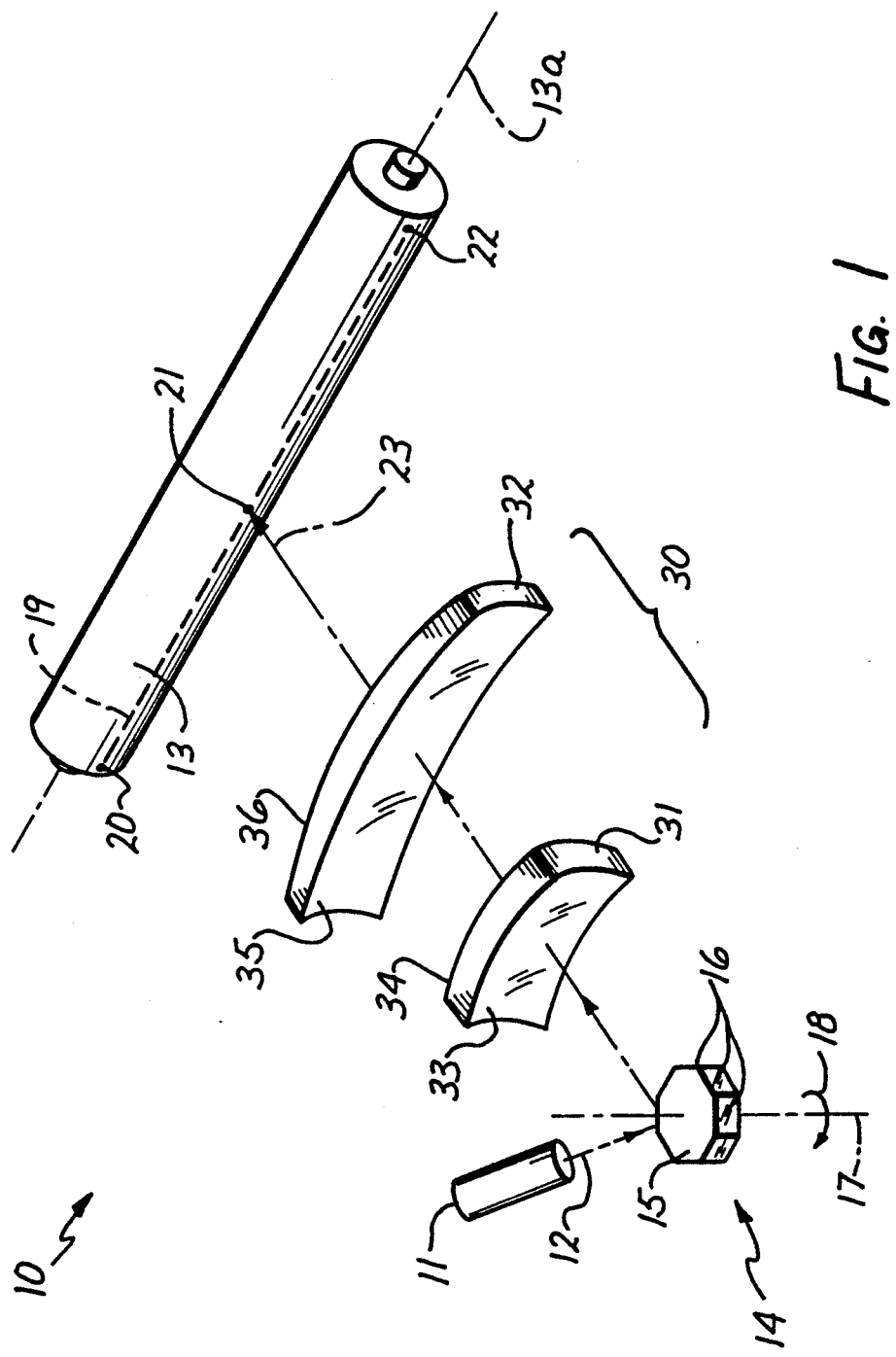
FIG. 1 of the drawings is a diagrammatic representation of a scanner constructed according to the invention.
Figure 2:
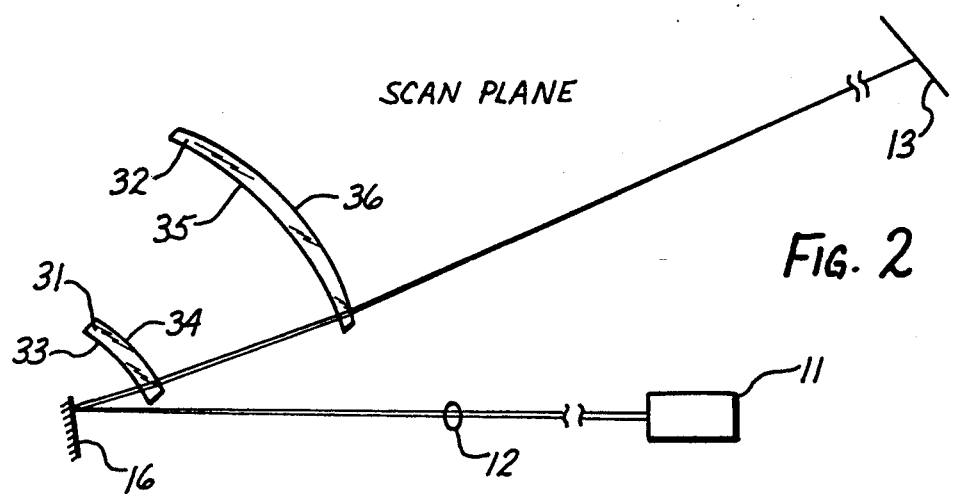
FIG. 2 is a diagrammatic representation of the scanner in the scan plane.
Figure 3:
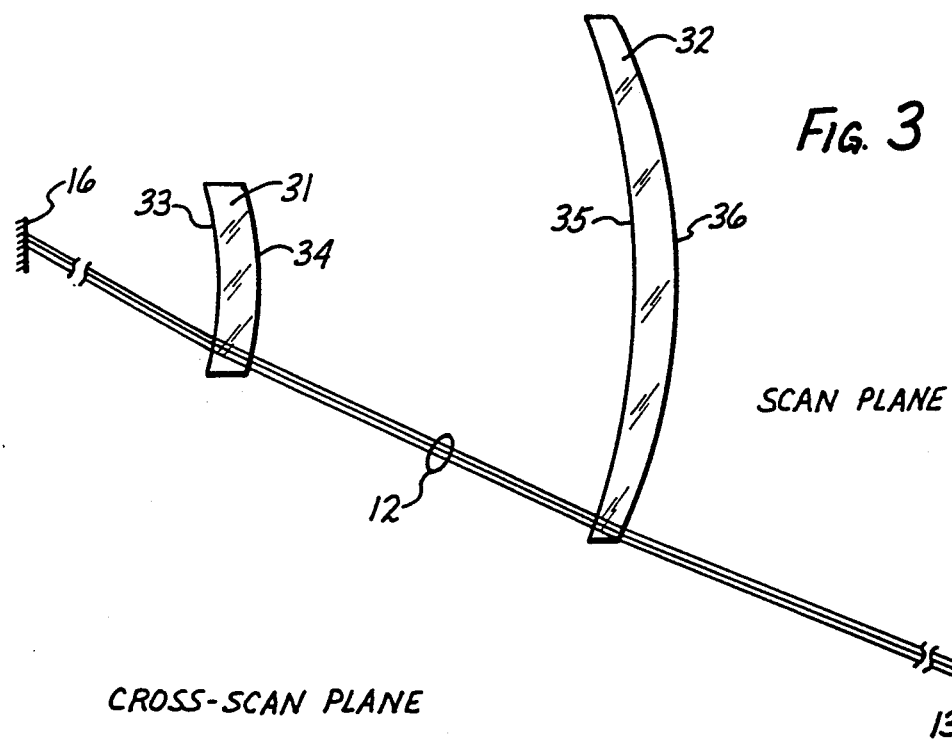
FIG. 3 is an enlarged diagrammatic representation of the post-facet lens system in the scan plane.

FIG. 1 illustrates a scanner system 10 constructed according to the invention. It is similar in many respects to the scanner system 10 described in parent application Ser. No. 496,459 filed Mar. 20, 1990, including a light source 11 for generating a light beam 12, a photoreceptor 13 at a predetermined location, and scanning means 14 for scanning the light beam 12 across the photoreceptor 13. The photoreceptor 13 may include a light sensitive medium on a drum suitably mounted for rotation about a rotational axis 13a, for example, and the scanning means 14 may include a rotatable element or polygon 15 with a plurality of light reflecting facets 16 (eight facets being illustrated). The scanning means 14 may include other known mechanical components that are depicted in FIG. 1 by the polygon 15 rotating about a rotational axis 17 in the direction of an arrow 18.

As the polygon 15 rotates, the light beam 12 is directed by the facets 16 toward the photoreceptor 13, scanning across the photoreceptor 13 in a known manner along a scan line 19 at a predetermined location relative to the polygon 15. The polygon 15 serves as means for directing the light beam 12 to a spot on a surface to be scanned (i.e., the photoreceptor 13) that is located at a predetermined location relative to the polygon 15 and for moving the spot across the surface along a scan line of predetermined length (i.e., the scan line 19). That is done so that the spot moves in a precisely controlled manner from a first end 20 of the scan line 19 past a center 21 of the scan line 19 and on to a second end 22 (e.g., a length of nine inches for the scan line 19).

Thus, the light beam 12 scans in a scan plane defined as a plane containing both the scan line 19 and a central light beam position 23 that is the position occupied by the light beam when it is directed toward the center 21 of the scan line 19 (i.e., the position of the light beam 12 that is illustrated in FIG. 1). Wobble results in the light beam 12 being directed above or below the scan line 19 in a direction perpendicular to the scan plane. In that regard, a plane containing both the central light beam position 23 and a line perpendicular to the scan plane is referred to as the cross-scan plane (X-scan plane).

The foregoing components may be similar in many respects to corresponding components in existing scanner systems. The light source 11 may include an infrared laser diode and known conditioning optics, for example. It forms a beam at the facets 16 that is collimated in the scan plane and focused in the cross-scan plane. That is done so that the beam has a proper diameter in the scan plane and a proper Numeric Aperture (NA) in the cross-scan plane. In the scan plane, the conditioning optic can be a single aspheric lens of short focal length, for example, or a laser diode collector which is similar to a microscope objective but designed for infrared light and for infinite conjugates. In the cross-scan plane, the optic has the same diode collector, with the addition of a cylinder lens to focus the collimated beam at the facets 16. Many of those things are well known in the art and reference is made to Brueggemann U.S. Pat. Nos. 4,512,625, 4,247,160, 4,230,394, 4,662,709, 4,805,974, 4,682,842, 4,624,528, and 4,595,947 for the various details of scanner system construction provided. For that purpose, reference is also made to Starkweather U.S. Pat. Nos. 4,475,787, 3,995,110, 3,867,571, 4,040,096, and 4,034,408.

One way the scanner system 10 differs from existing designs is in having a post-facet lens system 30 described with reference to FIGS. 1–4. The post-facet lens system 30 is interposed between the facets 16 and the photoreceptor 13, in the optical path of the light beam 12, and it includes a first element 31 and a second element 32. They are configured to compensate for field curvature and wobble and, according to a major aspect of the invention, they are composed of a plastic material.

In order to overcome the indeterminate surface tension problem of hot plastic, they are configured with curved surfaces. In order to overcome the change in focus accompanying changes in refractive index that plastic exhibits with changes in temperature, they are configured with less magnification (e.g. less than four) than the elements of existing post-facet lens systems. And, with a flat field, more of the depth-of-focus budget can be allocated to changes in focus. Based on the foregoing and subsequent descriptions, those things can be done according to known optical design techniques.

The first and second elements 31 and 32 are disposed as illustrated in FIGS. 1–4 so that the light beam 12 passes first through the first element 31 and then through the second element 32. In addition, the first element includes a first surface 33 and a second surface 34 such that the light beam 12 passes from first surface 33 to the second surface 34. Furthermore, the second element includes a first surface 35 and a second surface 36 such that the light beam 12 passes from the first surface 35 to the second surface 36. And, the surfaces 33–36 are so configured that they compensate for field curvature and wobble without compensating for scanner non-linearity. In that regard, the term "compensate" is not limited to completely correcting for the condition. It includes partial correction as well.

Preferably, compensation for field curvature and wobble without compensating for scanner non-linearity is accomplished by configuring the first and second elements 31 and 32 of the post-facet lens system 30 according to known optical design techniques so that the first surface 33 of the first element 31 is spherical, while the second surface 34 of the first element 31 and the first and second surfaces 35 and 36 of the second element 32 are toroidal. Also, the first surface 33 of the first element 31 is concave, the second surface 34 of the first element 31 is convex, the first surface 35 of the second element 32 is concave, and the second surface 36 of the second element 32 is convex. Moreover, the second surface 36 of the second element 32 is so configured that it has primary effect in correcting for wobble.

Stated another way, the first surface 33 of the first element 31 is spherical, the second surface 34 of the first element 31 has a first curvature in the scan plane and a second different curvature in the cross-scan plane, the first surface 35 of the second element 32 has a third curvature in the scan plane and a fourth different curvature in the cross-scan plane, and the second surface 36 of the second element 32 has a fifth curvature in the scan plane and a sixth different curvature in the cross-scan plane. Unlike the post-facet lens system described in the parent application, the second surface 34 of the first element 31 has curvature in both the scan plane and the cross-scan plane in order to overcome the problem of indeterminate surface tension. From the foregoing and subsequent descriptions, it becomes apparent that the first and second elements 31 and 32 and their surfaces 33–36 can be configured in any of various other ways according to known optical design techniques to compensate for field curvature and wobble without compensating for scanner non-linearity. All the surfaces 33–36 could be toroidal, for example.

Table A shows a prescription for the post-facet lens system 30 while Table B shows a prescription for the scanner system 10.

TABLE A

| Surface | Radius of Curvature (inches) | Thickness (inches) | Mat'l | Remarks |
|---|---|---|---|---|
| 1 Scan | −2.3797 | 0.250 | PolyC | Spherical |
| X-Scan | −2.3797 | | | |
| 2 Scan | −1.8583 | 2.300 | Air | Toroidal |
| X-Scan | −2.4834 | | | |
| 3 Scan | −4.2680 | 0.250 | PolyC | Toroidal |
| X-Scan | −2.0902 | | | |
| 4 Scan | −3.4064 | | Air | Toroidal |
| X-Scan | −0.8756 | | | |

PolyC = a polycarbonate material such as that available from General Electric Co. under the trademark LEXAN. This design is diffraction limited.

TABLE B

| Surface | Radius of Curvature (inches) | Thickness (inches) | Mat'l | Remarks |
|---|---|---|---|---|
| Facet | Flat | 0.800 | Air | |
| 1 Scan | −2.3797 | 0.800 | PolyC | Spherical |
| X-Scan | −2.3797 | | | |
| 2 Scan | −1.8583 | 2.300 | Air | Toroidal |
| X-Scan | −2.4834 | | | |
| 3 Scan | −4.2680 | 0.250 | PolyC | Toroidal |
| X-Scan | −2.0902 | | | |
| 4 Scan | −3.4064 | 7.891 | Air | Toroidal |
| X-Scan | −0.8756 | | | |
| Image | Flat | | | |

PolyC = a polycarbonate material such as that available from General Electric Co. under the trademark LEXAN. This design is diffraction limited.

Tables A and B specify prescriptions in a commonly employed manner. For example, the first line of the prescription in Table B specifies that the facet is flat, that there are 0.800 inches from the facet to the next surface (designated 1), and that there is air between the facet and the surface designated 1. The second line of the prescription specifies that the surface designated 1 (i.e., the first surface 33 of the first element 31) has a curvature in the scan plane of −2.3797, that there are 0.250 inches to the next surface (designated 2), that there is polycarbonate material between the surface designated 1 and the surface designated 2 (i.e., the first element 31 is composed of polycarbonate), and that the first surface 33 is spherical. The third line of the prescription specifies that the surface designated 1 has a curvature of −2.3797 in the X-scan plane (i.e., the cross-scan plane), the curvature being the same because the surface is spherical.

The fourth line of the prescription in Table B specifies that the surface designated 2 (i.e., the second surface 34 of the first element 31) has a first curvature in the scan plane of −1.8583. It specifies that there are 2.300 inches to the next surface (designated 3), that there is air between the surface designated 2 and the surface designated 3, and that the second surface 34 is toroidal. The fifth line of the prescription specifies that the surface designated 2 has a second curvature (different from the first curvature) of −2.4834 in the X-scan plane.

The sixth line of the prescription in Table B specifies that the surface designated 3 (i.e., the first surface 35 of the second element 32) has a third curvature in the scan plane of −4.2680. It specifies that there are 0.250 inches to the next surface (designated 4), that there is polycarbonate material between the surface designated 3 and the surface designated 4 (i.e., the second element 32 is composed of polycarbonate), and that the surface designated 3 is toroidal. The seventh line of the prescription specifies that the surface designated 3 has a fourth curvature (different from the third curvature) of −2.0902 in the X-scan plane.

The eighth line of the prescription in Table B specifies that the surface designated 4 (i.e., the second surface 36 of the second element 32) has a fifth curvature in the scan plane of −3.4064. It specifies that there are 7.891 inches to the next surface (the image at the photoreceptor 13), that there is air between the surface designated 4 and the photoreceptor 13, and that the surface designated 4 is toroidal. The ninth line of the prescription specifies that the surface designated 4 has a sixth curvature (different from the seventh curvature) of −0.8756 in the X-scan plane.

The tenth line of the prescription specifies that the image is flat. The eleventh and twelfth lines provide information about the polycarbonate material used for the elements, and the last line specifies that the design is diffraction limited. The term "diffraction limited" refers to the physical size (FWHM) of the scanning spot produced by the light beam 12 on the photoreceptor 13 and indicates that the size is determined only by the phenomenon known as diffraction, not by lens aberrations. The elements may be diffraction limited for one of 300, 400, 500, and 600 dots-per-inch (dpi). Spot size is commonly referred to in terms of dots-per-inch, the reciprocal of the actual spot size. For example, at 300 dots-per-inch, the actual spot size is 1/300 inches measured at what is commonly referred to as the Full Width Half Max (FWHM) so that there are 2700 dots for a nine inch long scan line.

According to another aspect of the invention, the light source 11 is configured to electronically compensate for scanner non-linearity. The light source 11 may be configured, for example, to include a scanning clock generating device for that purpose as described in Shimada et al. U.S. Pat. No. 4,729,617. That patent is incorporated by reference for the details provided.

Figure 4:
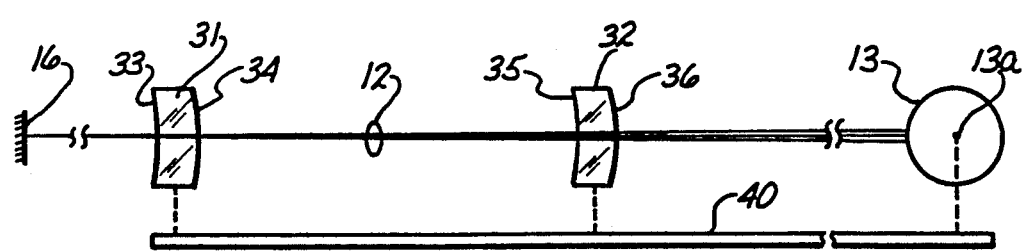
FIG. 4 is a diagrammatic representation of the post-facet lens system in the cross-scan plane.

According to yet another aspect of the invention, the post-facet lens system includes means defining a base or other suitable structure for linking the first and second lens elements to the predetermined location at which the surface to be scanned is located (i.e., the photoreceptor 13). Such a structure is depicted diagrammatically in FIG. 4 by a structure 40. It is configured according to known techniques and mechanically connected by suitable known means to the first and second lens elements 31 and 32 as depicted in FIG. 4 by broken lines extending from the structure 40 to the first and second elements 31 and 32. The structure 40 is also mechanically connected to the photoreceptor 13 by suitable known means, such as a yoke that connects it at the rotational axis 13a. That is depicted in FIG. 4 by a broken line extending from the structure 40 to the rotational axis 13a.

The structure 40 is at least partially composed of a material having a thermal coefficient of expansion such that dimensional changes in the structure occurring with changes in temperature at least partially compensates for changes in focus occurring with changes in temperature. In other words, a dimensional change in the structure 40 caused by a change in temperature causes a change in the positions of the first and second elements 31 and 32 relative to the photoreceptor 13. That in turn causes an offsetting change in the focus of the post-facet lens system that at least partially compensates for a change in focus caused by changes in the refractive index of the elements 31 and 32 accompanying the temperature change. Aluminium exhibits the desired characteristic, but existing fiber reinforced plastics do not. Preferably, the structure 40 is composed at least partially of a polycarbonate material. Of course, the structure 40 can be omitted without departing from the broader inventive concepts disclosed whereby the post-facet lens system includes plastic elements.

Thus, the invention provides a scanner with a post-facet lens system having plastic elements. They are configured to compensate for field curvature and wobble without compensating for scanner non-linearity. That relaxes the design so that the element surfaces can be curved to overcome indeterminate surface tension problems and configured with less magnification to reduce the change in focus occurring with changes in temperature. So the scanner is less costly and yet it avoids the problems associated with plastic lens elements. Where desired, a base is added as a mechanical linkage that helps reduce changes in focus otherwise occuring with temperature.

I claim:

1. A scanner system, comprising:
   light source means for producing a light beam;
   scanning means for directing the light beam to a spot on a surface to be scanned that is located at a predetermined location relative to the scanning means and for removing the spot across the surface along a scan line of predetermined length; and
   a lens system, having first and second lens elements, at least one of which is composed of plastic material, interposed between the scanning means and the scan line,
   the first and second elements each having first and second surfaces such that the light beam passes from the first surface of each element to its second surface,
   the first and second surfaces of each element compensating for field curvature and wobble by being configured according to the following prescription, wherein the light beam is focused at the scanning means in the cross-scan plane and collimated in the scan plane (dimensional unit in inches and the thickness dimension of the first surface, measured from said scanning means and the thickness of subsequent surfaces 1 to 4, are each measured from its previous surface):

| Surface | | Radius of Curvature | Thickness | Mat'l | Remarks |
|---|---|---|---|---|---|
| | | | 0.800 | | |
| 1 | Scan | −2.3797 | 0.250 | PolyC | Spherical |
| | X-Scan | −2.3797 | | | |
| 2 | Scan | −1.8583 | 2.300 | Air | Toroidal |
| | X-Scan | −2.4834 | | | |
| 3 | Scan | −4.2680 | 0.250 | PolyC | Toroidal |
| | X-Scan | −2.0902 | | | |
| 4 | Scan | −3.4064 | | Air | Toroidal |
| | X-Scan | −0.8756 | | | |

2. A scanner system as recited in claim 1 wherein the lens system is diffraction limited at one of the following resolution units: approximately 300 dots-per-inch, approximately 400 dots-per-inch, approximately 500 dots-per-inch, and approximately 600 dots-per-inch.

3. A scanner system, comprising:
   light source means for producing a light beam;
   scanning means for directing the light beam to a spot on a surface to be scanned that is located at a predetermined location relative to the scanning means and for moving the spot across the surface along a scan line of predetermined length; and
   a lens system, having first and second lens elements with a magnification of less than four in the cross-scan plane, at least one of which is composed of plastic material, interposed between the scanning means and the scan line for compensating for field curvature and wobble.

4. A scanner system, comprising:
   light source means for producing a light beam;
   scanning means for directing the light beam to a spot on a surface to be scanned that is located at a predetermined location relative to the scanning means and for moving the spot across the surface along a scan line of predetermined length;
   a lens system, having first and second lens elements with a magnification of less than four in the cross-scan plane, at least one of which is composed of plastic material, interposed between the scanning means and the scan line for compensating for field curvature and wobble; and
   means defining a structure for mechanically linking the first and second elements to the predetermined location at which the surface is located, which structure is at least partially composed of a material having a thermal coefficient of expansion such that dimensional changes in the structure occurring with changes in temperature, at least partially reduce changes in focus of the lens system that would otherwise occur with changes in temperature.

5. A scanner system as recited in claim 4, wherein the structure is at least partially composed of a polycarbonate material.

6. A system for optical scanning of a flat surface comprising:
   light source means for producing a light beam;
   scanning means for scanning the light beam in a scan plane across the flat surface;
   first and second lenses, at least one of which is composed of plastic material, disposed along the light beam between the scanning means and the flat surface, the first lens being closer to the scanning means and the second lens being closer to the flat surface,
   the first and second lenses having surface optical geometries in both the scan plane and in a cross-scan plane perpendicular to the scan plane that introduce minimum aberrations in the light beam so as to effectively minimize field curvature effects at the flat surface and compensate for the wobble effect of the scanning means,
   the first lens having surfaces wherein the separation thereof is substantially uniform in the cross-scan plane so as to minimize field curvature.

7. A system as in claim 6 further comprising non-optical means for compensating scanner non-linearity operatively coupled to the light source to electronically, selectively control the light beam produced by the light source to compensate for scanning means non-linearity.

8. A system as in claim 7 wherein the first lens has a concave spherical first surface towards the scanning means and a convex toroidal second surface towards the second lens, and the second lens has a concave toroidal first surface towards the first lens and a convex toroidal second surface towards the flat surface to be scanned.

9. A system for optical scanning of a flat surface comprising:

light source means for producing a light beam;

scanning means for scanning the light beam in a scan plane across the flat surface, wherein the scanning means inherently has scanner nonlinearity; and first and second lenses, at least one of which is composed of plastic material, disposed between the scanning means and the flat surface along the light beam, each having surface optical geometries in both the scan plane and in a cross-scan plane perpendicular to the scan plane that introduce minimum aberrations in the light beam so that, in combination, effectively compensate for the wobble effect of the scanning means and minimize field curvature at the flat surface, but do not compensate for scanner non-linearity, the first lens having a concave spherical first surface towards the scanning means and a convex toroidal second surface towards the second lens, with the separation between the first and second surfaces of the first lens substantially uniform in the cross-scan plane, and the second lens having a concave toroidal first surface towards the first lens and a convex toroidal second surface towards the flat surface to be scanned.

10. A system as in claim 9 further comprising means for electronically compensating for scanner non-linearity.

11. A system for optical scanning of a flat surface comprising:

means for producing a light beam;

scanning means for scanning the light bean in a scan plane across a flat surface, wherein the light beam scans at a speed that varies across the flat surface;

optical means interposed between the scanning means and the flat surface along the light beam, wherein said optical means comprises first and second plastic lenses, the first lens having a concave spherical first surface towards the scanning means and a convex toroidal second surface towards the second lens, with the separation between the first and second surfaces of the first lens substantially uniform in the cross-scan plane, and the second lens having a concave toroidal first surface towards the first lens and a convex toroidal second surface towards the flat surface, the lenses each having surface geometries in both the scan plane and in a cross-scan plane perpendicular to the scan plane which substantially minimize the wobble effect of the scanning means and field curvature effects at the flat surface; and means for compensating scanner non-linearity without introducing optical aberrations to the optical means.

* * * * *